No. 829,800. PATENTED AUG. 28, 1906.
E. PETERS.
FEED MECHANISM FOR MACHINE TOOLS.
APPLICATION FILED DEC. 20, 1905.
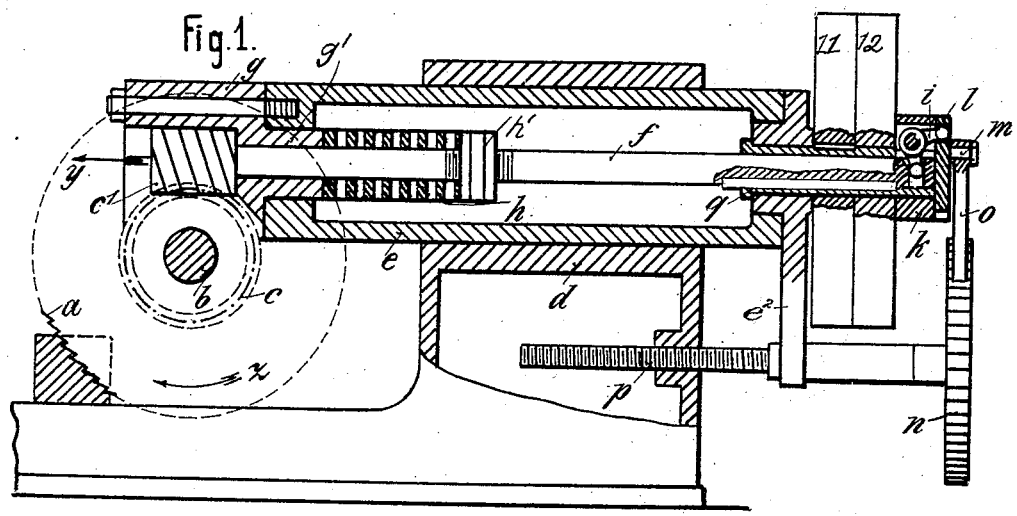
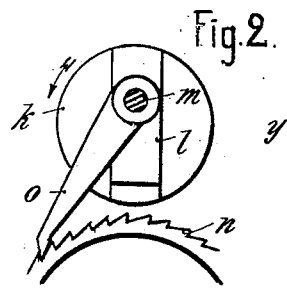
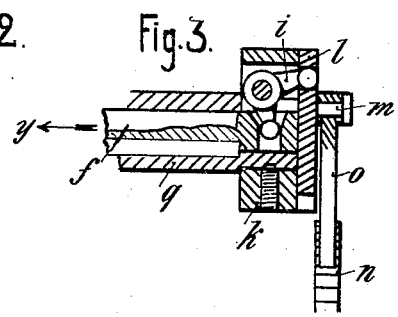
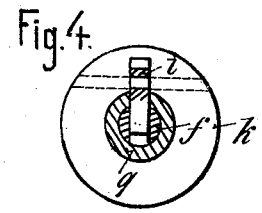
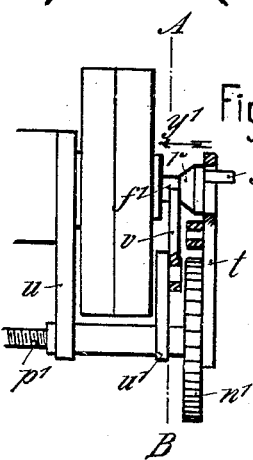
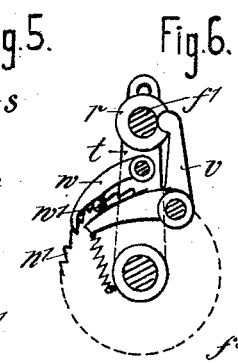
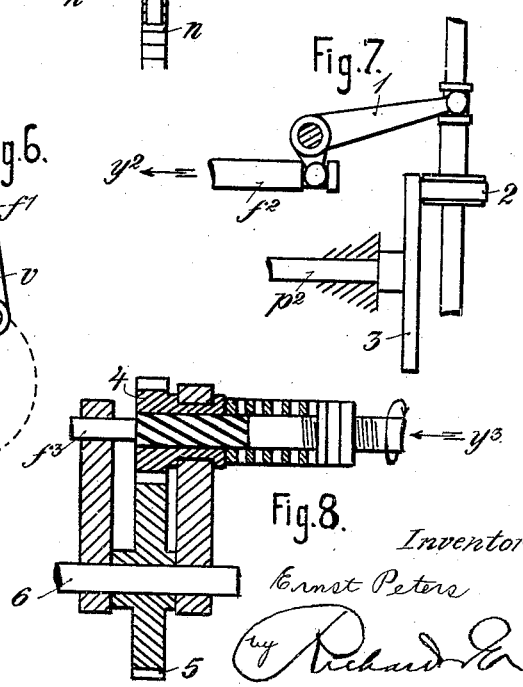
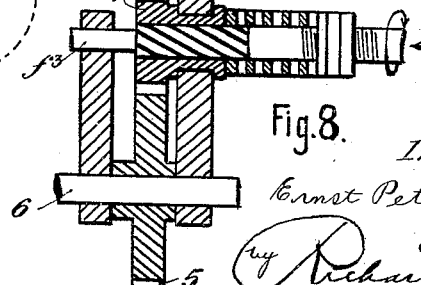
Witnesses:
A. Miller
John A. Percival
Inventor:
Ernst Peters
by Richard &c.
ATTYS

UNITED STATES PATENT OFFICE.

ERNST PETERS, OF DÜSSELDORF, GERMANY.

FEED MECHANISM FOR MACHINE-TOOLS.

No. 829,800.        Specification of Letters Patent.        Patented Aug. 28, 1906.

Application filed December 20, 1905. Serial No. 292,651.

*To all whom it may concern:*

Be it known that I, ERNST PETERS, a subject of the German Emperor, and a resident of Düsseldorf, Germany, have invented certain new and useful Improvements in Feed Mechanism for Machine-Tools, of which the following is a specification.

My said invention relates to improvements in machine-tools in which the feed of the cutter is effected by some moving part of the machine; and the object of the invention is to provide a simple, durable, and efficient construction in which the feed is automatically controlled by the variations in the resistance which the work offers to the tool or cutter.

With these and possibly other objects in view the invention includes the novel features of construction and arrangement and combinations of parts hereinafter described, and particularly pointed out in the appended claims.

The invention is illustrated in the accompanying drawings, in which—

Figure 1 is a sectional elevation. Fig. 2 is a detail side view of parts shown on the right of Fig. 1, and Fig. 3 is a longitudinal sectional detail of the same on a slightly larger scale. Fig. 4 is a detail sectional view taken transversely of Fig. 3. Fig. 5 is an elevation of a modified form. Fig 6 is a transverse sectional view of the form shown in Fig. 5. Fig. 7 is a diagrammatic view of a further modification; and Fig. 8, a detail view of a further modification, disclosing the use of pinions instead of worm-gearing.

Referring first to the form shown in Figs. 1 to 4, the reference character $a$ designates the tool, which for convenience is shown as a metal-cutting saw mounted upon a shaft $b$, journaled in suitable bearings depending from or carried by a part $g$, which has a shank $g'$, held in an opening in the end of the tool-slide, which is slidably supported in the main frame $d$. A drive-shaft $f$ is journaled at one end in the tubular shank or portion $g'$ and carries a worm $c'$, which meshes with a worm-wheel $c$ on the shaft $b$, whereby the cutter $a$ is driven by the rotation of the shaft $f$, which is driven from any suitable source of power in the manner hereinafter described. The opposite end of the shaft $j$ projects into a sleeve $q$, journaled in the end wall of the tool-slide, said parts $f$ and $q$ being connected by a longitudinal spline connection whereby they are capable of longitudinal movement with relation to each other, but are non-rotatably connected. Fast and loose pulleys 11 and 12 are connected to this sleeve for driving the shaft $f$. It will thus be seen that while the shaft $f$ will be rotated by the fast pulley it will be capable of movement longitudinally without disturbing its operating connections. The shaft $f$ is normally held pressed toward the right by a spring $h$, which encircles the shaft between the part $g'$ and an adjustable collar $h'$ on the shaft.

The sleeve $q$ carries a collar $k$, rigidly secured thereto in a recess in which is mounted a bell-crank lever $i$, one arm of which engages a recess in the shaft $f$, as shown in Figs. 1 and 3, while the other arm engages a similar recess in a slide-block $l$, movably held in a diametrically-arranged groove in the outer face of the collar $k$. This slide $l$ carries a wrist-pin $m$, to which is pivoted a pawl $o$, engaging the ratchet-teeth of a wheel $n$. This wheel $n$ is rigidly secured to a shaft $p$, which has a threaded portion engaging a corresponding threaded opening in the frame $d$. A bracket or arm $e^2$, depending from the slide $e$ and having a suitable rotatable but non-longitudinally-movable connection with the shaft or spindle $p$, causes the movement of said spindle, due to the rotation of the ratchet-wheel $n$, to be imparted to the slide to advance the cutter to its work. It will be readily seen that if the slide $l$ is moved inward to bring the wrist-pin nearer the axis of the shaft $f$ the eccentricity of the wrist-pin will be decreased, and consequently the throw of the pawl and the movement of the ratchet-wheel correspondingly lessened, retarding the feed of the carrier or slide $e$, while the opposite movement of the slide $l$ will increase the eccentricity of the wrist-pin and the feed will be increased. This movement is automatically controlled by the resistance of the work to the tool or cutter through the connections hereinbefore described in the following manner:

Supposing the work to offer so great resistance as to tend to retard the speed of the cutter, the worm $c'$ and shaft $f$ would be moved to a greater or less extent in the direction of the arrow $y$ against the tension of the spring $h$. This movement, through the bell-crank $i$ and slide $l$, reduces the eccentricity of the wrist-pin and lessens the feed, as hereinbefore described. As soon as the resistance of the work to the cutter lessens the spring moves the shaft $f$ and worm to the right, increasing the feed again.

In the modification shown in Figs. 5 and 6 the worm-shaft (designated $f'$) carries a fixed wrist-pin $s$, which imparts a constant throw to the pawl to rotate the feed-ratchet $n'$. A bell-crank lever $v$, pivoted on an arm $u'$, has one arm arranged to bear against the cone $r$ and its other arm provided with a pin $w'$ to engage with the pawl $w$. The pawl in this case is carried by the oscillating lever $t$, and it will be readily apparent that longitudinal movement of the shaft $f'$ will cause the cone $r$ to rock bell-crank lever $v$, and through pin $w'$ make a greater or less portion of the stroke of the pawl ineffective.

In the modification shown in Fig. 7 I dispense with the use of pawl-and-ratchet mechanism for effecting the feed, using friction-gearing 2 3 to drive the feed-screw $p^2$ and controlling the feed by shifting the friction-pulley 2 by a bell-crank 1 through the endwise movement of worm-shaft $f^2$.

In the modification shown in Fig. 8 I show how ordinary gearing may be substituted for the worm-gearing shown in Fig. 1. In this form the drive-shaft $f^3$ has a spirally-threaded portion on which is mounted a gear 4, which, through a corresponding gear 5, operates the cutter.

Having thus described my invention, what I claim is—

1. In a machine of the class described, the combination, with a rotary cutter and a power-transmitting gearing arranged to drive said cutter and embodying spiral coacting members, one of which is axially yieldable whereby an axial thrust of the yieldable spiral member is produced, of feeding mechanism for causing a relative approach of the work and cutter, a variable-speed-transmission device for actuating the said feeding mechanism, and means intermediate the power-transmitting gearing and the variable-speed-transmission device, whereby the ratio of transmission of the latter will be adjusted in proportion to the thrust produced by the spiral coacting members.

2. In a machine of the class described, the combination, with a rotary cutter, a rotatable driving-shaft arranged to move longitudinally when subjected to axial thrust, a power-transmitting gearing having spiral coacting members arranged to transmit power from the driving-shaft to the cutter and to transfer the reaction of the cutter to the driving-shaft as an axial thrust upon the latter, yielding means acting upon the driving-shaft in opposition to the said axial thrust, and a feeding mechanism for causing a relative approach of the work and cutter, of a variable-speed-transmission device for driving said feeding mechanism, and means actuated by the longitudinal movement of the driving-shaft for adjusting the variable-speed-transmission device, whereby the rate of relative approach of the work and cutter is varied.

3. In a machine of the class described, the combination, with a rotary cutter, a rotatable driving-shaft arranged to move longitudinally when subjected to axial thrust, a power-transmitting gearing having spiral coacting members arranged to transmit power from the driving-shaft to the cutter and to transfer the reaction of the cutter to the driving-shaft as an axial thrust upon the latter, yielding means acting upon the driving-shaft in opposition to the said axial thrust, and a feeding mechanism for causing a relative approach of the work and cutter, of a variable-speed-transmission device intermediate the driving-shaft and the said feed mechanism, and means actuated by the longitudinal movement of the driving-shaft for adjusting the ratio of transmission of the variable-speed-transmission device.

In testimony whereof I have hereunto signed my name in the presence of two witnesses.

ERNST PETERS.

Witnesses:
 WILLIAM ESSENWEIN,
 PETER LIEBER.